United States Patent
Chandhoke

(10) Patent No.: US 7,863,851 B2
(45) Date of Patent: Jan. 4, 2011

(54) CLOSED LOOP STEPPER MOTOR CONTROL

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 590 days.

(21) Appl. No.: 11/843,367

(22) Filed: Aug. 22, 2007

(65) Prior Publication Data

US 2009/0051310 A1 Feb. 26, 2009

(51) Int. Cl.
*H02P 8/00* (2006.01)

(52) U.S. Cl. ........................ 318/696; 318/685

(58) Field of Classification Search ............... 318/560, 318/628, 638, 652, 685, 696, 400.14
See application file for complete search history.

(56) References Cited

U.S. PATENT DOCUMENTS

| | | | | |
|---|---|---|---|---|
| 3,368,128 | A | 2/1968 | Parrish et al. | |
| 3,452,263 | A | 6/1969 | Newell et al. | |
| 3,662,245 | A | 5/1972 | Newell et al. | |
| 4,158,800 | A | 6/1979 | Jahelka et al. | |
| 4,386,553 | A * | 6/1983 | Thoman et al. | 91/361 |
| 4,423,365 | A * | 12/1983 | Turner | 318/561 |
| 4,459,527 | A | 7/1984 | Hayman | |
| 4,510,429 | A | 4/1985 | Squire | |
| 4,540,928 | A | 9/1985 | Marhoefer | |
| 4,618,808 | A * | 10/1986 | Ish-Shalom et al. | 318/696 |
| 4,700,120 | A | 10/1987 | Janes | |
| 4,978,991 | A | 12/1990 | Farrington | |
| 5,003,948 | A | 4/1991 | Churchill et al. | |
| 5,208,523 | A | 5/1993 | Harman | |
| 5,663,624 | A * | 9/1997 | Callaway | 318/696 |
| 5,847,475 | A * | 12/1998 | Rauch et al. | 310/49.47 |
| 5,847,535 | A | 12/1998 | Nordquist et al. | |
| 6,442,442 | B1 | 8/2002 | Weinhofer | |
| 6,598,196 | B1 * | 7/2003 | Bussard et al. | 714/746 |
| 6,870,346 | B2 * | 3/2005 | Davidov | 318/685 |
| 7,021,735 | B2 * | 4/2006 | Spicer | 347/19 |
| 7,049,785 | B2 | 5/2006 | Han | |
| 7,076,332 | B2 | 7/2006 | Cifra et al. | |
| 7,134,081 | B2 | 11/2006 | Fuller et al. | |
| 7,239,108 | B2 | 7/2007 | Best | |
| 7,321,175 | B2 | 1/2008 | Culpi et al. | |
| 7,339,342 | B2 | 3/2008 | Harada et al. | |
| 7,345,447 | B2 | 3/2008 | Doutney et al. | |

(Continued)

*Primary Examiner*—Walter Benson
*Assistant Examiner*—Antony M Paul
(74) *Attorney, Agent, or Firm*—Meyertons Hood Kivlin Kowert & Goetzel, P.C.; Jeffrey C. Hood; Joel L. Stevens

(57) ABSTRACT

System and method for controlling a stepper motor. A current position of the stepper motor may be received. A position error of the stepper motor may be determined using the current position of the stepper motor. A velocity profile may be maintained based on the position error, such that it tracks the position error. A position correction value may be determined based on the velocity profile, e.g., by integrating a portion of the velocity profile. A new position value may be generated to drive the stepper motor. An output position value to the stepper motor may be provided to drive the stepper motor. The output position value may incorporate the new position value and the position correction value and may be operable to reduce position error of the stepper motor.

20 Claims, 3 Drawing Sheets

U.S. PATENT DOCUMENTS 7,351,179 B2 4/2008 Spickard
2005/0275907 A1* 12/2005 Crooker et al. .............. 358/486
2007/0040529 A1* 2/2007 Takebayashi et al. ....... 318/685

* cited by examiner

CLOSED LOOP STEPPER MOTOR CONTROL

FIELD OF THE INVENTION

The present invention relates to the field of motion control, and more particularly to a system and method for closed loop stepper motor control.

DESCRIPTION OF THE RELATED ART

Typically, stepper motors and/or servo controlled motors are used to achieve precise angles and control for various mechanical systems, e.g., for biomedical fluid analysis, semiconductor or wafer sorting and scanning, PCB/chip alignment for vision inspection, etc. Stepper motors are generally used as open loop systems which deliver high performance without requiring feedback systems or control system tuning (as required by servo systems, e.g., to avoid ringing and oscillations using typical PID control). As a result, stepper motors can be used quickly and efficiently, but do lack precise position information which may result in inaccurate response and control.

Correspondingly, some manufacturers have begun monitoring the position of the stepper motor in order to correct for missed steps during moves. For example, an encoder may be installed on the motor which provides positional information to the control system. As a result, the control system may detect position of the stepper motor after a move and then execute an error correction move to correct any error of the original move. Thus, some control systems do allow for closed loop control of stepper-motors.

However, these systems have some drawbacks. For example, cycle times for the control system invariably increase where an error correction move is performed after a move is completed. Furthermore, corruption in position geometry may occur (e.g., if the move being executed is not a straight line), considerable lag time in correction may occur (since correction is not performed until after a move is completed), position error is not corrected when the axis is standing still, and no correction may be performed when the axis of the movement is used as a slave to a master.

Correspondingly, improvements in closed loop stepper control are desired.

SUMMARY OF THE INVENTION

Various embodiments of a system and method for controlling a stepper motor are presented below.

The control system may include a primary or actual axis for controlling the stepper motor (e.g., using conventional open loop stepper motor control techniques) and a secondary monitoring axis for generating correction positions. In some embodiments, the primary axis may act via conventional open loop control methods for a stepper motor. Note that in various embodiments the primary axis and the secondary monitoring axis may be referred to as primary and secondary controllers.

The secondary monitoring axis may receive position information of the stepper motor in order to calculate a position change to be added to position values from the primary axis. The output of the addition may be provided to the stepper motor. Thus, the secondary monitoring axis may act as an axis for monitoring error of the stepper motor and provide or allow for closed loop control of the stepper motor. In some embodiments, the secondary axis may include axis or control variables (e.g., move constraint parameters, such as, maximum velocity, maximum acceleration, maximum deceleration, acceleration jerk, deceleration jerk, position error limit, error correction window etc.). These variables may be independent of the parameters of the primary axis.

The secondary monitoring axis may calculate or receive the position error of the stepper motor every period and may determine a velocity correction (e.g., a new velocity override value) based on the position error. The monitoring axis may update a velocity profile by adding the velocity correction to the velocity profile. The monitoring axis may then generate a position correction value using the velocity profile (e.g., by integrating all the values in the velocity profile which exceed zero in the latest period to exceed zero). The monitoring axis may provide the position correction for incorporation with the next position change from the primary axis to correct position error of the stepper motor in a smooth and continuous manner (e.g., to correct for stalls or lost steps due to resonance or ringing).

However, it should be noted that the secondary monitoring axis may simply receive the position error and determine or calculate a position correction directly, without determining velocity corrections, as desired.

Thus, the primary axis may provide open loop control of the stepper motor and the secondary monitoring axis may monitor error of the stepper motor and may allow for closed loop control of the stepper motor.

BRIEF DESCRIPTION OF THE DRAWINGS

A better understanding of the present invention can be obtained when the following detailed description of the preferred embodiment is considered in conjunction with the following drawings, in which.

Figure 1:
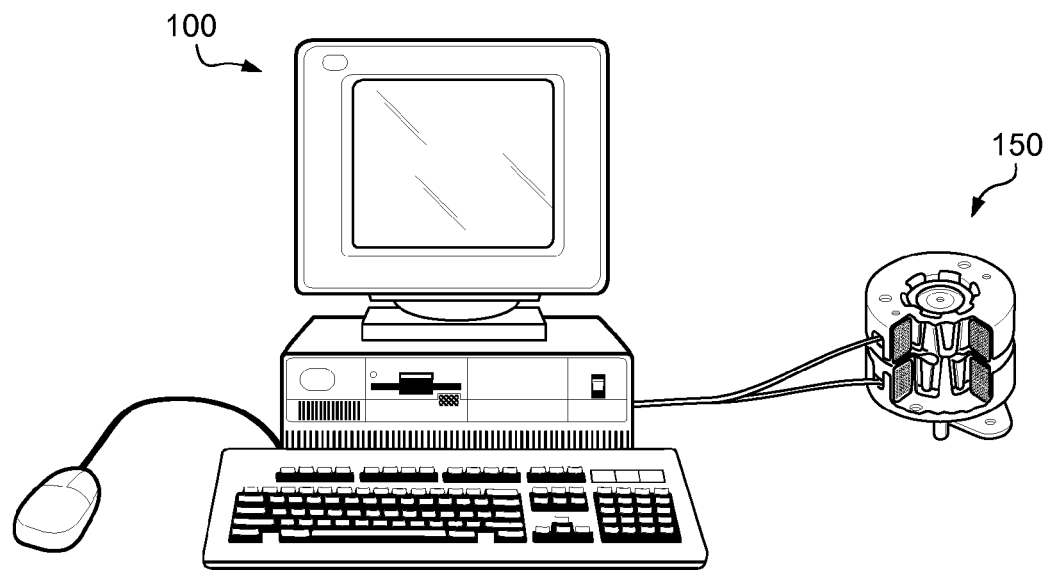
FIG. 1 illustrates a control system according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1—Exemplary Control System

FIG. 1 illustrates a computer system 100 operable to perform motion control for stepper motor 150. As shown in FIG. 1, the computer system 100 may include a display device and one or more human interface devices. The display device may also be operable to display a graphical user interface, e.g., during execution of control software. The graphical user interface may comprise any type of graphical user interface, e.g., depending on the computing platform.

The computer system 100 may include at least one memory medium on which one or more computer programs or software components according to one embodiment of the present invention may be stored. For example, the memory medium may store one or more control programs which are executable to perform the methods described herein. The memory medium may also store operating system software, as well as other software for operation of the computer system. Various embodiments further include receiving or storing instructions and/or data implemented in accordance with the foregoing description upon a carrier medium.

However, it should be noted that the computer system 100 may be any type of controller, as desired. For example, the stepper motor 150 may be controlled by programmable logic controller(s) (PLCs), programmable automation controllers (PACs), and/or other control systems that use programmable hardware elements and/or processors.

As shown, the computer system 100 may be coupled to the stepper motor 150. In various embodiments, the computer system 100 and the stepper motor 150 may be coupled via a variety of methods, e.g., directly connected, coupled over a network, etc. Additionally, the stepper motor 150 may include an encoder or component which can detect the current position of the stepper motor. Correspondingly, the stepper motor 150 may be operable to provide that position information to the computer system 100 (e.g., the control software executing on the computer system 100) in order to provide feedback on the operation of the stepper motor 150.

Figure 2:
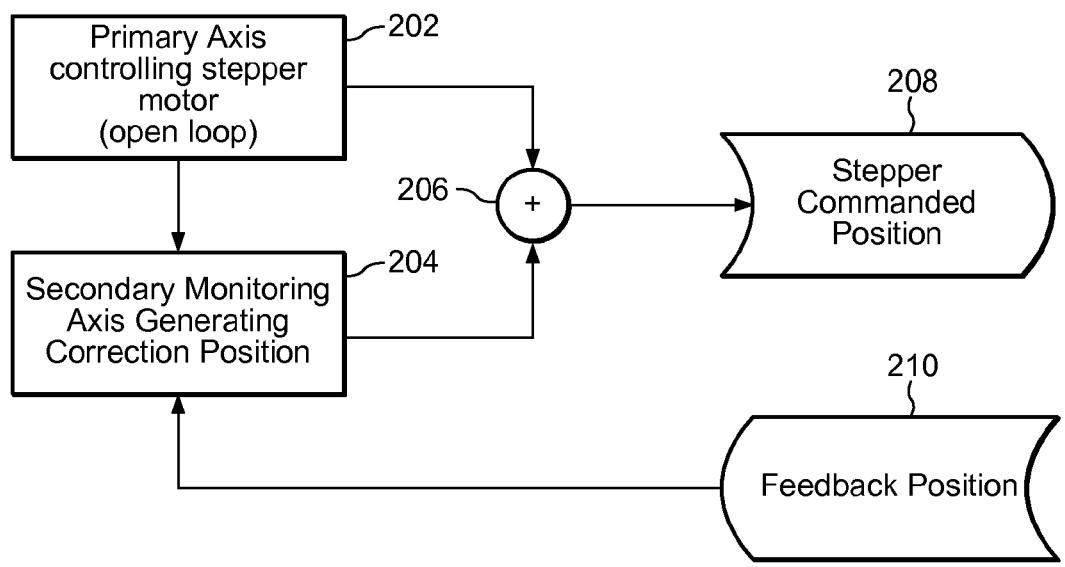
FIG. 2 illustrates a block diagram of a control system according to one embodiment.

FIG. 2—Block Diagram of Exemplary Control System

As shown in FIG. 2, the control system may include a primary or actual axis 202 for controlling the stepper motor 150 (e.g., using conventional open loop stepper motor control techniques) and a secondary monitoring axis 204 for generating correction positions. In some embodiments, the primary axis may act via conventional open loop control methods for a stepper motor. Note that in various embodiments the primary axis and the secondary monitoring axis may be referred to as primary and secondary controllers.

The secondary monitoring axis 204 may receive position information of the stepper motor 150 (e.g., feedback position 210) in order to calculate a position change to be added to position values from the primary axis 202 (e.g., via the addition shown in 206). The output of 206 may be provided to the stepper motor as indicated in stepper commanded position 208. Thus, the secondary monitoring axis 204 may act as an axis for monitoring error of the stepper motor and provide or allow for closed loop control of the stepper motor. In some embodiments, the secondary axis may include axis or control variables (e.g., move constraint parameters, such as, maximum velocity, maximum acceleration, maximum deceleration, acceleration jerk, deceleration jerk, position error limit, error correction window etc.). These variables may be independent of the parameters of the primary axis 202.

The secondary monitoring axis 204 may calculate or receive the position error of the stepper motor every period and may determine a velocity correction (e.g., a new velocity override value) based on the position error. The monitoring axis 204 may update a velocity profile by adding the velocity correction to the velocity profile. The monitoring axis 204 may then generate a position correction value using the velocity profile (e.g., by integrating all the values in the velocity profile which exceed zero in the latest period to exceed zero). The monitoring axis 204 may provide the position correction for incorporation with the next position change from the primary axis 202 to correct position error of the stepper motor in a smooth and continuous manner (e.g., to correct for stalls or lost steps due to resonance or ringing).

Thus, the primary axis may provide open loop control of the stepper motor 150 and the secondary monitoring axis may monitor error of the stepper motor and may allow for closed loop control of the stepper motor 150. Further embodiments regarding control of the stepper motor 150 are provided below.

Figure 3:
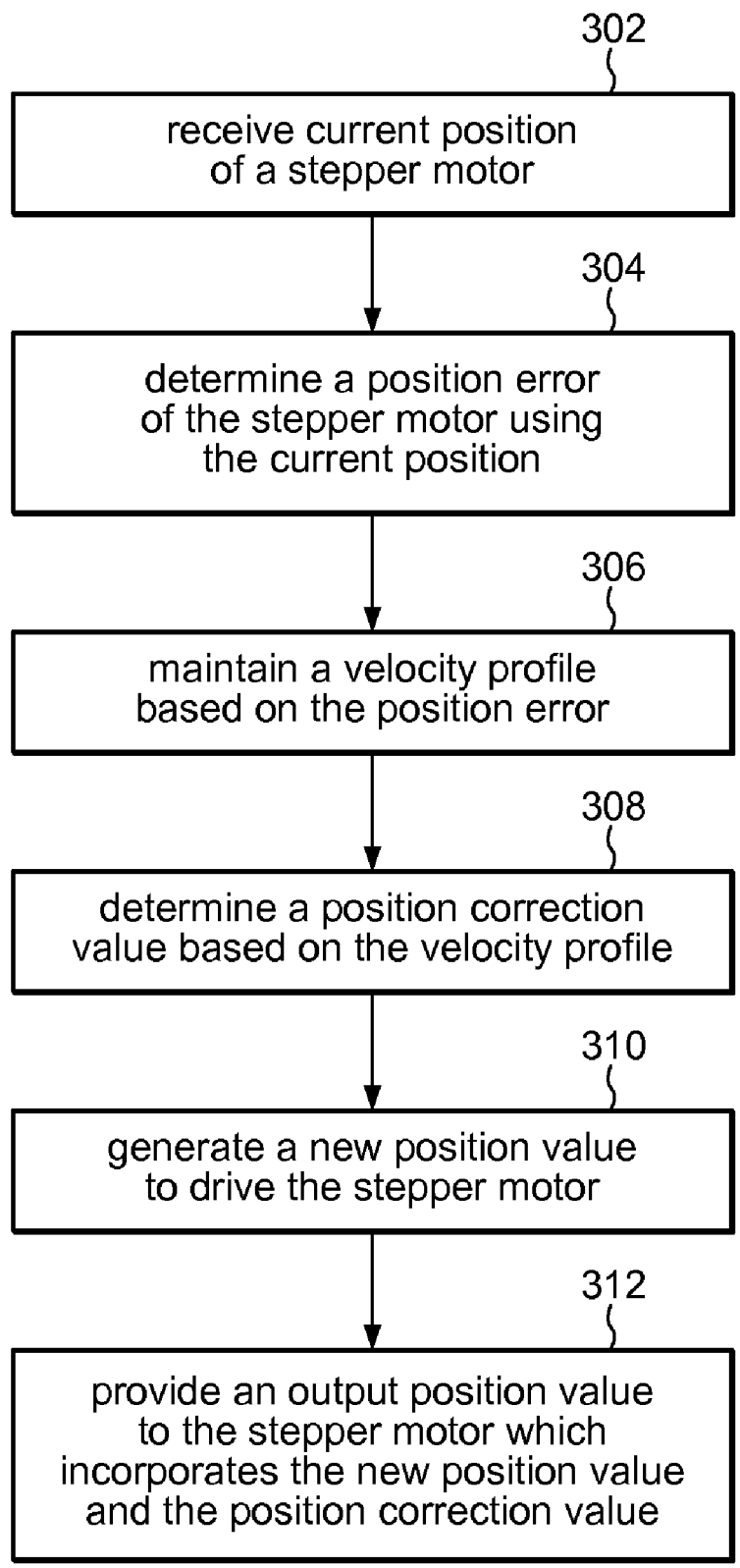
FIGS. 3 and 4 are flowchart diagrams illustrating embodiments of a method for controlling a stepper motor.

FIG. 3—Controlling a Stepper Motor

FIG. 3 illustrates an exemplary method for controlling a stepper motor. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, the current position of a stepper motor may be received (e.g., by the secondary controller). As indicated above, the stepper motor and/or control system may include an encoder or other component which measures the current position of the stepper motor. Information regarding the current position may be transmitted to the control system (e.g., the secondary controller or axis of the control system).

The current position of the stepper motor may be received in a periodic or cyclical fashion. For example, the position of the stepper motor may be received based on a time based cycle and/or on a move or sub-move based cycle. In one embodiment, the current position occurs every 250 microseconds to 1 millisecond, for example. Alternatively, or additionally, the position of the stepper motor may be monitored as each move or submove is performed. In one embodiment, the stepper motor may follow a position trajectory, e.g., provided by the primary axis/controller. The position trajectory may contain a series of positions which describe a move or series of moves. Correspondingly, the position of the stepper motor may be received according to the position trajectory. Thus, the current position of the stepper motor may be received, e.g., based on a time or move cycle, among others.

In 304, position error of the stepper motor may be determined (e.g., by the secondary controller) using the current position. For example, calculating the position error may include comparing the current position with an expected position. In one embodiment, the expected position may be extracted or derived from the position trajectory, e.g., of the primary controller. In one embodiment, the position trajectory may correspond to the periodic measurement of position. Thus, each time the position is received, that position may be compared with a previous target position (for the current move) and a new position may be provided to the stepper motor. In this embodiment, the position error may simply be the difference between the previous provided position and the current position (provided in 302).

Alternatively, the expected position may be derived using the previously provided position to drive the stepper motor and the amount of time that has passed since that provided position. Thus, in some embodiments, the expected position may be inferred or calculated, and then may be used to determine the position error.

The position error may be provided to a controller of the stepper motor. For example, the position error may be received by the secondary controller (e.g., the secondary monitoring axis).

In 306, a velocity profile may be maintained (e.g., by the secondary controller) based on the position error. Maintaining the velocity profile may include determining and storing a velocity modification value based on the position error for each position error that is determined. Thus the velocity profile may comprise a data set of past (and current) velocity modification values calculated in past iterations of 306 as described herein. In one embodiment, the velocity modification value may be (or may be derived from) a velocity override value. As used herein, velocity override is intended to encompass its typical control definition and is typically expressed as a percentage of the maximum velocity of the controller (e.g., the secondary controller). In one embodiment, the velocity override value may be calculated according to the following exemplary formula:

Velocity Override=(abs(Position Error)*100)/Position Error Limit where Velocity Override may not exceed an upper bound (which may be set using a parameter, e.g., of the secondary controller). If necessary, a velocity value may be derived using the velocity override value and the maximum velocity parameter (e.g., Velocity=Velocity Override Value*Maximum Velocity).

Alternatively, velocity override may not be used as a velocity modification parameter (e.g., if velocity override is not available). Instead, a new velocity proportional to the position error may be calculated (e.g., using a formula similar to above). In this embodiment, it may be necessary to load the new calculated velocity value into the velocity profile and restart the correction profile (e.g., of the secondary controller).

For example, in one embodiment, a new velocity maximum parameter (or base velocity value) may be calculated and used for the velocity profile (resulting in a recalculation of the velocity profile). In this embodiment, the velocity profile may be restarted for the secondary controller.

The sign of the velocity modification value may be reversed if the direction of the position error has changed from a previous position error. For example, if the position error has followed the following values (0, 1, 2, 1), the position error will have reversed direction on the fourth iteration (where error decreases from 2 to 1). In other words, if the derivative of the position error curve goes below zero, the velocity modification value may be reversed. This change may prevent overcorrection of position error due to some methods for correcting the position error (e.g., integration methods described below).

In one embodiment, maintaining the velocity profile may include deleting or erasing the velocity profile if the position error has reached zero. This may reduce memory requirements and may make position correction value calculation easier to perform (see below). Thus, the velocity profile may be maintained in 306.

In 308, a position correction value may be determined (e.g., by the secondary controller) based on the velocity profile. In some embodiments, the position correction value may be calculated from the velocity modification value. For example, in one embodiment, a formula may be used to translate the velocity change to a position change, e.g., using the time period of the cycle of the control system.

Alternatively, or additionally, the position correction value may be determined by integrating the velocity profile. For example, the position correction value may be determined by integrating over all values in the velocity profile since the last time the profile has been zero (indicating no position error). However, where the velocity profile is erased whenever the profile reaches a zero value, the position correction value may be determined by simply integrating over all values of the velocity profile. Using this integration method, the sign change of the velocity profile (based on a change in position error) may be used to prevent overshooting of error correction. Thus, once error correction begins to take effect, the magnitude of the position correction value should decrease (due to the new point in the velocity profile being negative or positive depending on the situation).

In 310, a new position value may be generated (e.g., by the primary controller) to drive the stepper motor. The new position may be generated according to the position trajectory of the primary axis as described above. Thus, in one embodiment, the new position may be generated using conventional open loop stepper control methods.

In 312, an output position value may be provided to the stepper motor which incorporates the new position value and the position correction value. The output position value may simply be the sum of the new position value and the position correction value. Alternatively, the output position value may use a weighted combination of the two values, or may use a fraction of the position correction value, as desired. The new position value may be provided to the stepper motor via the primary controller, the secondary controller, and/or other systems associated with the controller, as desired.

As indicated above, the method of FIG. 3 may be performed cyclically in a periodic fashion. Thus, the method of FIG. 3 may be used continuously during operation of the stepper motor to correct for position error.

Figure 4:
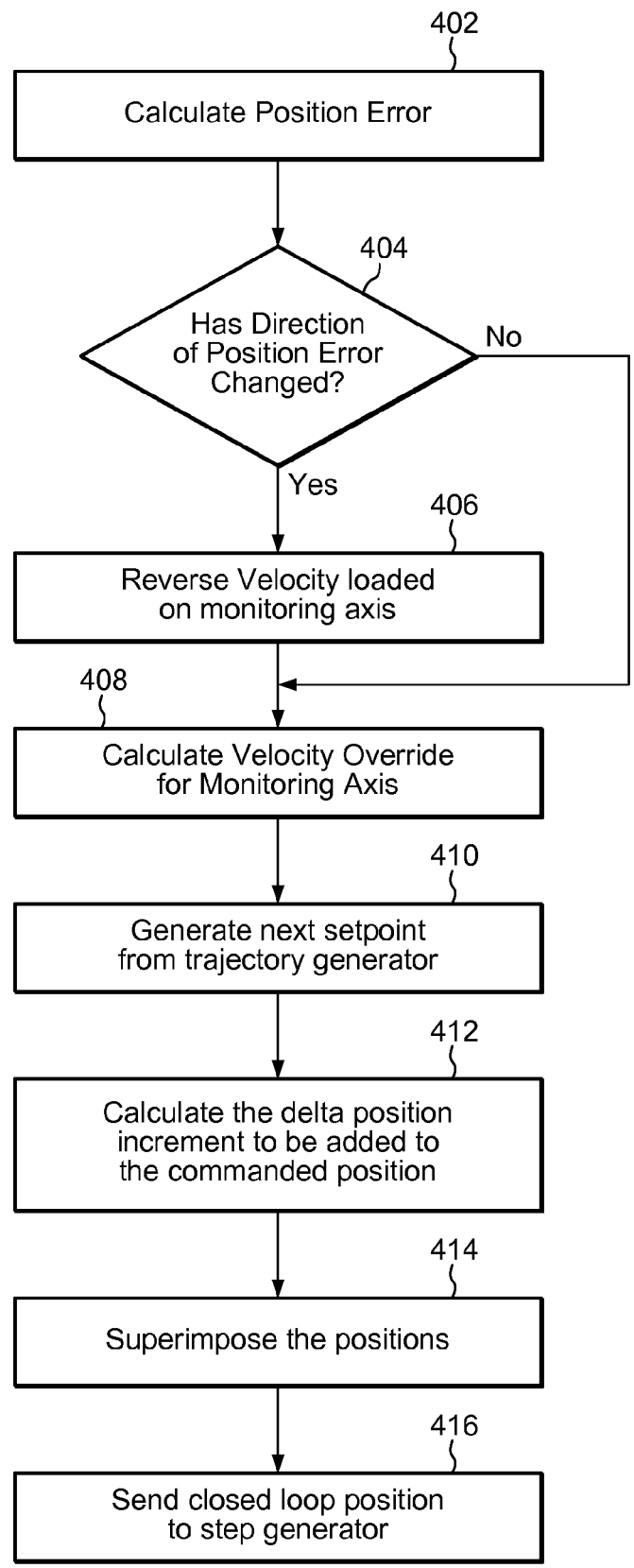

FIG. 4—Exemplary Specific Method for Controlling a Stepper Motor

FIG. 4 illustrates an exemplary specific method for controlling a stepper motor. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, position error may be calculated, e.g., after the first position has been executed by the stepper motor. As indicated above, the stepper motor may include a component (e.g., an encoder) which may detect the reached position of the stepper motor. The position error may be determined by comparing the reached position of the stepper motor with the expected position of the stepper motor based on the first position of the stepper motor.

In 404, the direction of the position error may be determined. If the direction of the position error has changed, e.g., by comparing the current position error direction with a previous position error direction, the sign of the velocity correction (as calculated in 408) may be reversed (406).

In 408, a velocity override may be calculated, e.g., for the secondary axis 204.

In 410, the next setpoint may be generated, e.g., by the primary axis 202, for the stepper motor.

In 412, a delta position may be calculated using the velocity override (or a profile of the velocity override).

In 414, the delta position and the next setpoint may be superimposed to generate a new position for transmission to the stepper motor.

In 416, the new position may be transmitted to the stepper motor.

Thus, FIG. 4 provides an exemplary method for controlling a stepper motor. As indicated above, the method of FIG. 3 may be performed cyclically in a periodic fashion. Thus, the method of FIG. 3 may be used continuously during operation of the stepper motor to correct for position error.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for controlling a stepper motor, the method comprising:
   receiving a current position of the stepper motor;
   determining a position error of the stepper motor using the current position of the stepper motor;
   maintaining a velocity profile based on the position error;
   determining a position correction value based on the velocity profile;
   generating a new position value to drive the stepper motor, wherein said generating is performed independent of the position error;
   providing an output position value to the stepper motor to drive the stepper motor, wherein the output position value incorporates the new position value and the position correction value, and wherein the output position value is operable to reduce position error of the stepper motor.

2. The method of claim 1, wherein said maintaining the velocity profile comprises determining a velocity modification value based on the position error.

3. The method of claim 2, wherein the velocity modification value comprises a velocity override value.

4. The method of claim 3, wherein said maintaining the velocity profile comprises using a position error limit, and wherein said modifying the velocity override parameter is performed using the following formula:

Velocity Override=(abs(Position Error)*100)/Position Error Limit.

5. The method of claim 1, wherein said modifying the velocity override parameter comprises using a velocity override limit, and wherein the velocity override parameter does not exceed the velocity override limit.

6. The method of claim 1, wherein said maintaining the velocity profile comprises using a position error limit.

7. The method of claim 1, wherein said determining a position correction value comprises integrating the velocity profile.

8. The method of claim 1, wherein said receiving, said determining, said maintaining, said determining, said generating, and said providing are performed a plurality of times in a periodic fashion.

9. The method of claim 1, wherein said maintaining the velocity profile comprises:
determining if the direction of the position error has changed; and
reversing the sign of a new point in the velocity profile.

10. The method of claim 1, wherein said generating a new position is performed by a primary controlling axis, and wherein said receiving the current position, said determining the position error, said maintaining the velocity profile based on the position, and said determining a position correction value is performed by a secondary monitoring axis.

11. A memory medium for controlling a stepper motor, wherein the memory medium stores program instructions executable to:
receive a current position of the stepper motor;
determine a position error of the stepper motor using the current position of the stepper motor;
maintain a velocity profile based on the position error;
determine a position correction value based on the velocity profile;
generate a new position value to drive the stepper motor, wherein said generating is performed independent of the position error; and
provide an output position value to the stepper motor to drive the stepper motor, wherein the output position value incorporates the new position value and the position correction value, and wherein the output position value is operable to reduce position error of the stepper motor.

12. The memory medium of claim 11, wherein said maintaining the velocity profile comprises determining a velocity modification value based on the position error.

13. The memory medium of claim 12, wherein the velocity modification value comprises a velocity override value.

14. The memory medium of claim 13, wherein said maintaining the velocity profile comprises using a position error limit, and wherein said modifying the velocity override parameter is performed using the following formula:

Velocity Override=(abs(Position Error)*100)/Position Error Limit.

15. The memory medium of claim 11, wherein said modifying the velocity override parameter comprises using a velocity override limit, and wherein the velocity override parameter does not exceed the velocity override limit.

16. The memory medium of claim 11, wherein said maintaining the velocity profile comprises using a position error limit.

17. The memory medium of claim 11, wherein said determining a position correction value comprises integrating the velocity profile.

18. The memory medium of claim 11, wherein said receiving, said determining, said maintaining, said determining, said generating, and said providing are performed a plurality of times in a periodic fashion.

19. The memory medium of claim 11, wherein said maintaining the velocity profile comprises:
determining if the direction of the position error has changed; and
reversing the sign of a new point in the velocity profile.

20. A system comprising:
a first controller, wherein the first controller is configured to control a stepper motor using open loop control, wherein the first controllers uses a position trajectory to control the stepper motor, and wherein the first controller is configured to:
generate an output signal for driving the stepper motor, wherein the output signal corresponds to a first point in the position trajectory, wherein said generating is not based on position error of the stepper motor; and
a second controller, wherein the second controller is configured to:
determine a position error of the stepper motor using a current position of the stepper motor prior to the stepper motor receiving the output signal;
determine a velocity override value to correct the position error;
determine a delta position value using the velocity override value; and
provide the delta position value for modifying the output signal to generate a modified output signal to drive the stepper motor, wherein the modified output signal corrects position error of the stepper motor;
wherein the modified output signal is provided to drive the stepper motor.

* * * * *